Feb. 3, 1959  J. OBREBSKI ET AL  2,871,886
MANIFOLD
Filed April 26, 1955
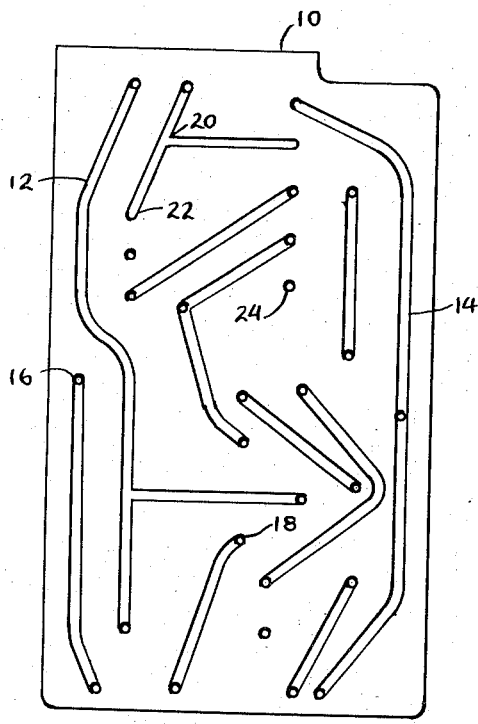
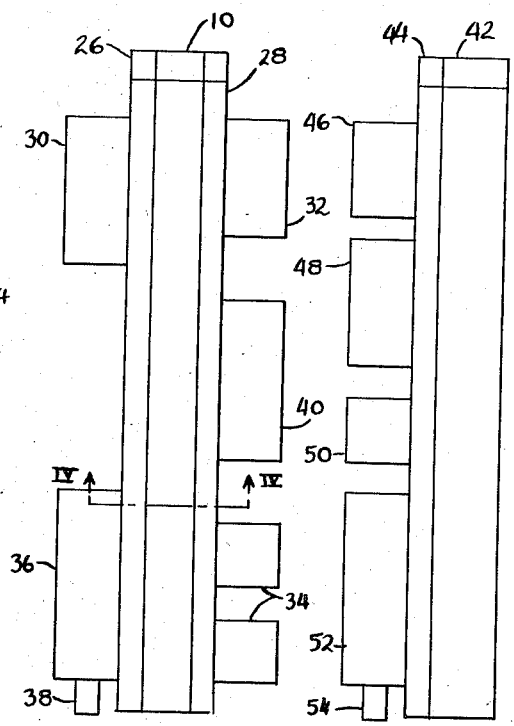
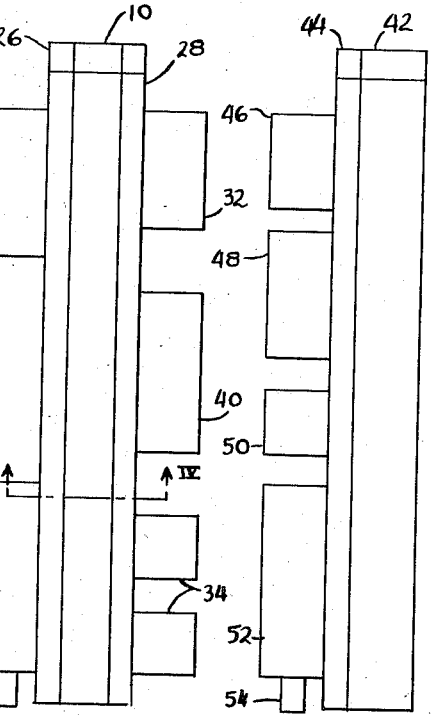
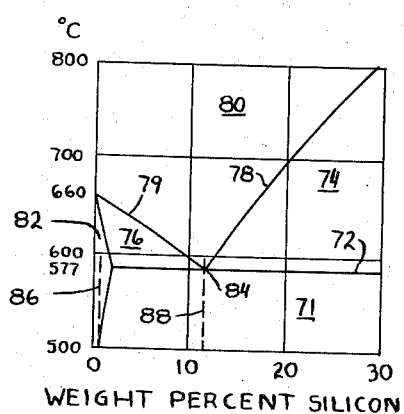
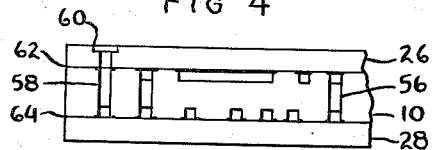
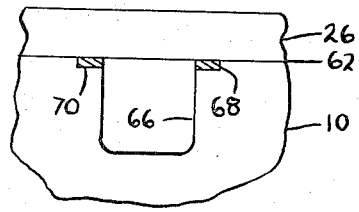
INVENTORS
JOHN OBREBSKI
BY NAGLE V. GUSCHING
Allen A Dicke jr.

United States Patent Office 2,871,886
Patented Feb. 3, 1959

2,871,886

MANIFOLD

John Obrebski and Nagle V. Gusching, Sidney, Ohio, assignors to The Monarch Machine Tool Company, Sidney, Ohio, a corporation of Ohio Application April 26, 1955, Serial No. 503,862

3 Claims. (Cl. 138—87)

This invention relates to securing a series of plates together in sandwich form wherein some of the plates contain grooves for the passage of hydraulic fluid and the other plates serve as covers to enclose the grooves and make them independent passages to conduct hydraulic or other fluid for flow or pressure signals. The prior methods of conducting fluids through tubing had considerable problems such as the cost of fabrication, the errors which could be made by inexperienced workmen assembling the tubing circuit, and the reduction in life caused by vibration and fatigue in the tubing. This application is a continuation-in-part of our application for patent regarding our invention entitled "Manifolding" filed April 26, 1955, Serial Number 504,000, and this application includes the disclosure thereof by this reference.

Accordingly, it is an object of this invention to fabricate channels for the conduction of fluids more economically than by prior methods.

It is another object of this invention to provide means whereby channel junctions and connections can be readily made without the chance of errors.

It is a further object to provide a sandwich of plates or a manifold having strength and long life when compared to the ordinary tubing methods by the elimination of vibration and consequent fatigue problems.

It is another object to provide fluid channels which are comparatively inexpansible under high fluid pressures.

It is another object to provide a manifold which provides smooth curves to permit smooth flow of fluids without the turbulence caused by rough passages and quick changes in size or direction of the fluid passageway.

It is another object to provide means which permit the use of complex fluid circuits without the otherwise necessary complex stands of tubing and the associated error possibilities.

It is a further object to provide an aluminum manifold which is free from the problems of rusting such as occurs with steel tubing and most other iron containing materials, and which is inert to the usual atmospheres which are found in hydraulic environments.

It is another object to provide an aluminum manifold which is inert to oil and thus prevents the formation of harmful components within the hydraulic fluid thereby preventing harm to the equipment associated therewith.

It is a further object to provide an increased width of solid braze material by notching out reliefs in the solid body plate adjacent and joining the grooves.

Other objects and advantages will be apparent on reading of the following specification and inspection of the drawing referred to therein in which:

Figure 1 shows a side elevation of the center member or body plate of a manifold, Figure 2 shows an edge elevation of a finished manifold laminated of three sections and showing hydraulic components mounted thereon, Figure 3 shows an edge elevation of a manifold laminated of two sections and having hydraulic components mounted thereon, Figure 4 shows a partial section through the manifold taken on the line IV—IV of Figure 2, Figure 5 shows a detailed section through one of the passages of a brazed manifold plate such as are shown in Figure 4, and Figure 6 shows a portion of the aluminum-silicon phase diagram.

Referring now to Figure 1, at 10 is shown the one side of a manifold plate having a plurality of grooves such as 12 and 14 in the flat side of the plate. These grooves may be formed in the plate by casting the body plate in an appropriate mold and having the grooves cast therein or preferably by using wrought or other aluminum stock and milling the grooves therein. As is hereinafter described the grooves are covered by another plate and thus form passages for the conduction of hydraulic fluid or other fluid power or signal medium. Because of this purpose the grooves may be formed in any configuration which is in accord with the hydraulic and mechanical requirements of the finished plate. The other side of body plate 10 also has grooves formed therein in a configuration determined by the requirements. In some cases the ends of the grooves have holes drilled through the plate 10 such as holes 16 and 18. These holes may pass straight through the plate and such other plates as may be ultimately brazed to the side of body or center plate 10 which is away from the viewer to connect to a valve or line, or may pass only to the other side of the center plate where another groove may conduct the fluid in a different direction. It should be noted that several grooves may be connected together as at 20 and that some of the grooves may have ends such as 22 which do not connect through the plate but are connected by a hole in the outer plate that is ultimately brazed on the side nearest the viewer. Furthermore, some of the grooves on the farther side of the body plate 10 may be connected by means of holes such as 24 through the body plate 10 and outer or cover plate on the near side of center plate 10.

In Figure 2 the body plate 10 is shown as having outer plates 26 and 28 brazed thereto. It can be seen from the foregoing that the configuration of the grooves in the center plate 10 can be of any shape which is reasonable and desired by the designer. Thus, outlets to actuate valves such as is shown at 30 and 32 may be provided from the grooves of the center plate and the valves may be interrelated with other hydraulic components such as filters 34 or a hydraulic actuator such as member 36 which contains a piston having a piston rod 38. The system could be designed so that pressure is supplied through an external connector such as a tube and tubing fitting (not shown) to a groove in the center plate 10 and this pressure is supplied to a certain groove in the body of valve 30. A signal from valve 32 might move the valve stem in valve 30 to supply a signal which passes through one of the filters 34 before it passes through an orifice in valve 40. Valve 40 could readily be connected to operate the piston rod 38. It is thus seen that complex fluid circuits can readily be designed in a compact manner and be free from the more usual complex tubing. It should be noted that tubing is subject to fatigue and vibration as well as errors in assembly and the use of a manifold also provides for the physical mounting of hydraulic components.

Figure 3 shows a similar situation with a body plate 42 having grooves cut in only one side thereof. These grooves are covered by a cover plate 44 to provide continuous fluid passages similar to those previously discussed. It should be noted however that when the grooves are cut in only one side of a plate the circuit must be relatively simple for there is no provision for the crossing of grooves as is possible in the plate laminated from three parts as in Figure 2. In similar manner the plate in Figure 3 has valves 46 and 48 mounted thereon and it may also be provided with a filter such as 50 and an actuator such as 52 having a piston and piston rod 54.

Figure 4 shows a section through a manifold plate laminated from the body plate 10 and the outer plates 26 and 28. Here, the grooves are shown as being connected from one side of the plate to another as at 56 and being connectable to an exterior member by passage 58 which is sealable by an O-ring in O-ring groove 60. The use of O-rings is the preferred manner of making fluid tight connections to the hydraulic components. The lines at 62 and 64 show the layer of brazing alloy.

Figure 5 shows a detailed section of a groove 66 in the plate 10. Groove 66, and the other grooves in the faces of body plate 10 and in the face of body plate 42 are provided with reliefs 68 and 70 at the juncture of the body plate and cover plate. These reliefs may be formed by casting them in if the body plate is cast with the grooves therein, or preferably may be milled in with the grooves when wrought sheet is used for the body plate. They are preferably of rectangular cross section with the width about twice the depth. The depth, however, should not be so large that the capillary forces which draw the molten braze alloy into the relief are reduced to ineffectiveness. The volume of the reliefs depends on the amount of braze alloy present, for the reliefs should be filled, but no more molten braze alloy should be present than is required to fill them. The shape of the reliefs may be different than rectangular in cross section for they may be a simple bevel to give a triangular section. The figure shows the groove covered by an outer plate 26, and after brazing of this sandwich, the reliefs 68 and 70 are filled with braze alloy to make a tight fluid passageway of the channel 66. It should be noted that when brazing the large flat areas such as are found in these plates it is quite difficult to remove all of the flux from the joint. There is always a possibility that one channel may be open across the flat part to an adjacent channel due to flux inclusions. However, the reliefs filled wtih braze alloy make a tight passageway for the action of the braze alloy being drawn into the reliefs by capillary action forces out the flux.

The materials used in properly brazing together a sandwich which is mechanically and hydraulically tight must be carefully chosen so that they meet all of the requirements of the situation. As previously stated the body and cover plates are preferably manufactured of aluminum and in order to cooperate properly with aluminum brazing alloy, they should have a relatively low silicon content.

Referring now to the phase diagram of Figure 6, the horizontal notation shows the percentage by weight of silicon in aluminum and the vertical scale shows the temperature in degrees centigrade. The area 71 represents a solid crystalline mixture including crystals containing silicon dissolved in aluminum. Below the solidus 72 at 577° C. the alloy is solid. In the areas 74 and 76 the consistency is that of liquid containing unmelted crystals. The closer the alloy reaches the liquidus lines 78 and 79 the fewer crystals are in the liquid alloy and the alloy becomes more fluid. Closer to the solidus line 72 the alloy is more pasty in consistency because it contains more crystals. In the area 80 the alloy is liquid and in the area 82 the alloy is solid with silicon completely dissolved in the aluminum. A eutectic point 84 occurs at 11.6% silicon.

The alloy of the body and cover plates is chosen to have less than 1.65% silicon, the limit of the amount of silicon soluble in aluminum at 577° C., so that the temperature of these plates may be raised above the horizontal part of the solidus for brazing purposes without having them lose shape. In practice an alloy of .6% silicon and having .25% copper and 1.0% magnesium to control oxidation is suitable. In commercially available alloys impurities of chromium, iron, zinc, manganese and titanium are normally found. The dotted line 86 indicates generally the line along which this alloy would be heated during a brazing operation. It should be noted, however, that the addition of alloying elements in addition to silicon changes the phase diagram somewhat from the pure aluminum-silicon diagram shown in Figure 6 which is merely exemplary.

Brazing alloy is chosen to have similar constituency but has about 11.6% silicon. The silicon content of the brazing alloy may be anything over 1.65% for as soon as such an alloy is heated above 577° C., the solidus 72, liquid appears, but the closer the alloy is to 11.6% silicon the more rapidly melting occurs. For practical purposes between 8 and 15 percent silicon is operative but the closer the alloy is to the eutectic the lower the temperature at which it becomes fluid. It should be noted that the fluidity of the brazing alloy has a great bearing on the manner in which it fills reliefs 68 and 70. With high fluidity they are sound while with less fluidity they will normally be more likely to be porous due to flux inclusions. Extreme fluidity due to overheating will cause the braze alloy to run out of the reliefs due to low surface tension and capillarity. The braze alloy would be heated along a line such as line 88 and if it was a true eutectic alloy it would become completely molten at 577° C. This alloy may be physically furnished to the brazing area in the form of brazing sheet which is cut to the appropriate shapes, as wire which is laid between the several plates, or preferably as an integral part of one side of each of the plates 26 and 28 by being clad thereon. In this case the brazing alloy is rolled onto one side of plates 26 and 28 to form a brazing layer thereon. Of course, it could equally well be clad on the sides of the body plate. This clad plate is commercially available and the brazing alloy clad runs between .010 and .020 inch thick on one side of each outer plate and this is suitable for the purpose. The use of a clad brazing alloy is advantageous because it cuts in half the number of surfaces that must be fluxed.

The method of treatment of the various portions of the manifold are important for numerous problems can arise if improper procedures are used. If a cast center plate having grooves cast therein is used the sides must be made relatively smooth and flat. Milling the sides is usually sufficient, providing tool marks and tool overlaps are kept to a minimum. If a wrought center plate is used it is cut to the appropriate external shape and the necessary grooves are milled and holes are drilled therein. When the elements of the manifold plate have been physically prepared, they are assembled in the manner in which they will finally be brazed. Then they are placed between two comparatively heavy flat jigs and are annealed in sandwich form for five hours at about 455° C. This makes sure that they are flat and that there are no residual stresses internal of the members which would cause them to warp during the subsequent brazing process. Five hours are required because of the relatively heavy masses of the jigs which are necessary to hold the members flat during the annealing. After cooling from the anneal, the plates are cleaned by etching in caustic soda which is maintained at 5 to 10% strength and at about 170° F. The caustic soda is followed by a cold water wash and a dip in nitric acid in about 50% concentration. Another cold water wash and a hot water wash precede a dip in a mixture of nitric and hydrofluoric acids in a water solution. This solution is about 10% nitric and .25% hydrofluoric acid. Here the concentrations above a minimum are prescribed by the desired speed of reaction and economic limits, and the minimum concentrations are given above. Next the plates are washed in cold water and brushed to remove loose dirt. The above cycle is repeated until all aluminum oxide is removed from the plate surfaces. Finally the plate is dried by blowing with compressed air or the like.

Now each of the surfaces is fluxed by suitable means with a flux containing fluorides and chlorides which dissolve aluminum oxide, and thermocouples are appropriately placed to enable accurate temperature observation. The manifold is assembled and placed on a flat jig and is loaded into the furnace wherein the temperature at the braze alloy surfaces is raised to 584 to 590° C. When this temperature is attained the manifold is removed from the furnace and cooled. The manifold plate is etched in the manner described above to clean it of all traces of excess oxides which were formed by furnace temperatures and excess flux. As a final step the manifold is tested to assure tight passages and free flow through the passageways.

It sometimes occurs that small machining operations must be done after the manifold is brazed together. Sometimes pipe threads used to connect tubing fittings to the manifold grooves must be cleaned up with a tap after brazing, and sometimes holes which were omitted in previous processing must be drilled. This action would leave objectionable chips which would jam valves in the manifold so the chips are removed by etching in the caustic soda described hereinabove. Such etching removes about .001 inch per minute from the chips and all other aluminum present. The reliefs filled with braze alloy present a thick seal for the grooves and the grooves remain well sealed for any reasonable length of etching. For this reason, as well as the fact they present a stronger bond of braze alloy, the use of reliefs is superior to the reliance upon fillets for sealing.

This invention having been described in its preferred embodiment is susceptible to numerous modifications and changes and it is desired that the scope of the invention be defined by the appended claims.

What we claim is:

1. In an aluminum manifold having passageways therein defining a plurality of separate fluid conduits, a flat body plate having grooves therein defining the shape of the separate fluid passageways, a flat cover plate closing the grooves to form the separate passageways, aluminum containing brazing alloy between said body plate and said cover plate, said body plate and cover plate co-operating with said brazing alloy to make the passageways fluid pressure tight with respect to each other, said cover plate having holes therethrough to provide communication to said passageways, said body plate having reliefs provided along the edges of the grooves adjacent the juncture between said grooves and said cover plate, said body plate and said cover plate being substantially all aluminum, said aluminum containing brazing alloy also containing silicon, and said reliefs along the juncture between said body plate and said cover plate being filled with said brazing alloy to render said fluid passageways fluid tight.

2. In an aluminum manifold having passageways therein for defining a plurality of separate fluid conduits, a body plate having grooves therein defining the shape of the separate fluid passageways, a cover plate covering said grooves to form enclosed passageways, said cover plate having holes therethrough to provide communication to said passageways, reliefs formed in said body plate at the edges of said grooves adjacent said cover plate, solid brazing alloy securing said plates together, said solid brazing alloy being in the reliefs at the juncture between said plates to assure fluid tight passageways, the plates being made of an alloy of aluminum and less than 1.65% silicon, and said brazing alloy being made of an alloy of aluminum and more than 1.65% silicon.

3. The manifold of claim 2 wherein the brazing alloy is clad on one of the plates.

References Cited in the file of this patent
UNITED STATES PATENTS

| | | |
|---|---|---|
| 1,964,300 | Perry et al. | June 26, 1934 |
| 1,983,227 | Hall et al. | Dec. 4, 1934 |
| 2,154,217 | Sauage | Apr. 11, 1939 |
| 2,312,451 | Strike | Mar. 2, 1943 |
| 2,443,574 | Burns | June 15, 1948 |
| 2,458,427 | Russell et al. | Jan. 4, 1949 |
| 2,465,260 | Olsen | Mar. 22, 1949 |
| 2,479,047 | Long | Aug. 16, 1949 |
| 2,602,413 | Miller | July 8, 1952 |
| 2,640,793 | Doerr | June 2, 1953 |
| 2,646,620 | Geddes et al. | July 28, 1953 |
| 2,646,995 | Thompson | July 28, 1953 |
| 2,659,138 | Stroup | Nov. 17, 1953 |